BEVERLY J. BUCHANAN,
INVENTOR.

BY *H[signature]*

ATTORNEY.

United States Patent Office

2,814,429
Patented Nov. 26, 1957

2,814,429

DIAPHRAGM PUMP

Beverly J. Buchanan, Long Beach, Calif.

Application October 11, 1954, Serial No. 461,541

14 Claims. (Cl. 230—55)

This invention relates to improvements in diaphragm pumps of the reciprocable type, and more particularly has to do with improvements in pumping diaphragms and diaphragm carried armatures, such as have the effect of reducing wear, eliminating vibration, and promoting improved efficiency of pumping action.

In certain diaphragm pump applications it is important that the pumping units run quietly and efficiently for long periods of time, which necessitates the reduction of wear and the elimination of vibration of moving parts, insofar as is possible. In such pumps it is equally important that high output pressures be realizable. Particularly in regard to electromagnetically actuated diaphragm pumps of the type used to pump air or other gases, such as aquarium aerator pumps, have the effects of vibration and wear been evident, in that metallic armatures moving closely adjacent electromagnet parts often begin to audibly vibrate against such parts, with resulting malfunctioning of the pump. More importantly, realizable pumping pressures are limited largely by the tendency of reciprocating armatures to vibrate, as described. In addition, undesirable wear of the diaphragm adjacent its points of support near its edges, and rubbing engagement during pumping between the diaphragm and mounting means carried thereby have the effect of decreasing the useful life of the pumping diaphragm and decreasing operating efficiency of the pump.

A primary purpose of the present invention is the provision of an armature having a shape such as will eliminate the cause of its vibration against electromagnet parts. For this purpose, the armature is constructed to have an external surface protuberant or projected toward the actuating pole of the electromagnet in such a way that the center portion of the armature surface projects toward the pole further than all other armature surface portions. The extent of such projection is such as to preclude engagement of other armature surface portions against the electromagnet parts should there be axial or other misalignment of the armature with respect to the electromagnet, during reciprocation of the pump.

Freeing of the diaphragm for more efficient pumping, at the point of connection of the armature to the diaphragm are realized according to the present invention by minimizing the area of the diaphragm surfaces engageable with the armature mounting means. Accordingly, when a pin is used to connect the armature to the diaphragm and passes through an opening in the diaphragm, the wall of the opening is relieved in such a way as to have minimum areal engagement with the pin, so that rubbing contact therebetween on reciprocation of the diaphragm is eliminated. This construction effectively reduces wear and frees the diaphragm for more efficient pumping, reducing power input requirements.

Another feature of the invention includes the provision of resilient or elastomeric diaphragm mounting means normally positioned to bear against one or both faces of the diaphragm near its edge to retain the edge in fixed position relative to displacement of the center of the diaphragm. In its preferred form, the mounting means comprises an annular resilient or elastomeric ring adapted to bear against the diaphragm near its edge, the resiliency of the ring allowing it to deflect slightly in accommodation to the flexing of that portion of the diaphragm overlapping the ring. This action allows the overlapping portion of the diaphragm to curve slightly toward the position of the displaced central portions of the diaphragm, and thereby to relieve internal stresses in the diaphragm such as would otherwise contribute to wear and fatigue of the diaphragm at the overlap line, were the mounting means to comprise a rigid body.

Other features and objects of the invention as well as the details thereof will be understood more fully and to best advantage by reference to the accompanying drawing, in which.

Figure 1:
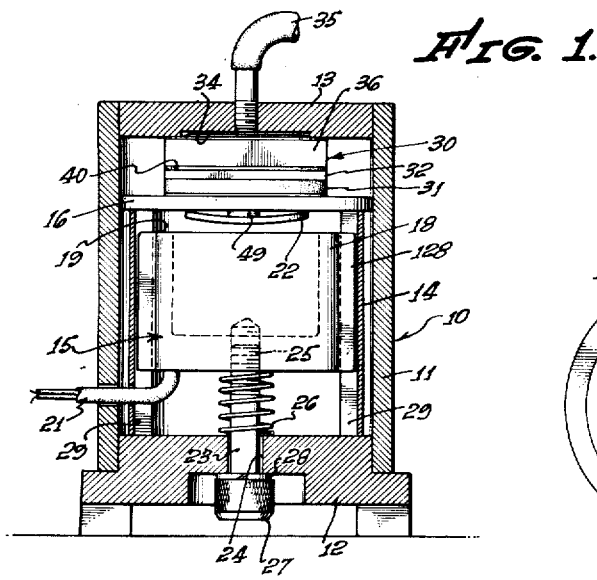
Fig. 1 is an elevational cross-sectional view of a pump in which the present invention is embodied.

Referring first to Fig. 1 the pump shown comprises a housing, generally indicated at 10, including a cylindrical shell 11 receiving in its lower end a bottom section or closure 12, and within its upper end a top closure 13. The housing contains an inner tubular wall 14 which supports a suitable motor generally indicated at 15, below ring 16.

Figure 2:
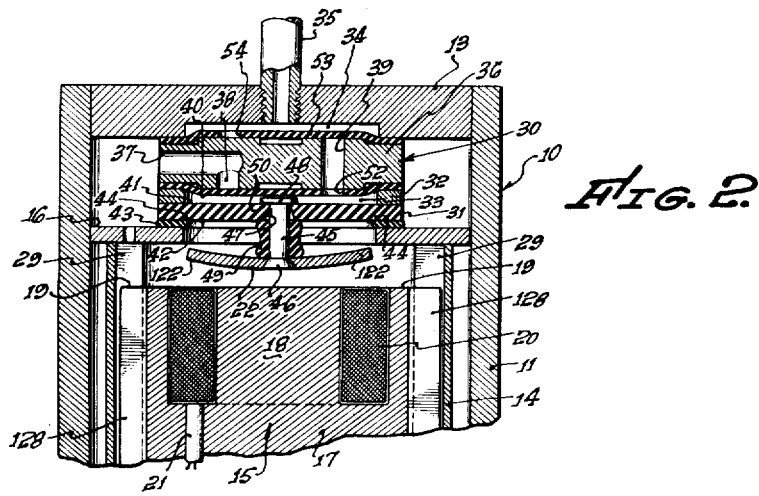
Fig. 2 is an enlarged view of a portion of the pump shown in Fig. 1 illustrating details of the invention.

Typically, the motor comprises a core 17 having an E-shape in cross-section as shown in Fig. 2, including a center pole 18 and an annular side pole 19 spaced therefrom, and having a solenoid winding 20 wrapped around the center pole 18 and connected with electrical alternating current leads 21. The motor 15 is positionally adjusted, relative to the armature 22 to be described, by a stud 23 extending through opening 24 in the bottom closure 12, the upper end 25 of the stud being threaded into the core 17. A compression spring 26 is positioned between the bottom of the motor 15 and the top of the closure 12 to urge the cap 27 mounted at the bottom of the stud and the washer 28 upward against the bottom surface of the closure 12. When the cap is rotated, the motor 15 is moved toward or away from the armature 22 and is guided in its axial displacement by means of ribs 128 received between spaced guides 29 projecting inwardly from the wall of the shell 14.

A valve assembly generally indicated at 30 and a pump diaphragm 31 are retained between the ring 16 and the top closure 13, and are spaced apart by an annular gasket 32 having a central opening 33. All outer surfaces of the valve assembly about the opening 33 are clamped between the gasket 32 and the undersurface of the top closure 13 about a recess 34 formed therein and from which an outlet 35 leads. The valve assembly 30 comprises a body 36 containing an inlet passage 37 and connected port 38 opening at the underside of the body, and a discharge port 39 extending through the body from its bottom to top surfaces about the ports. The faces of the body may have raised seating surfaces as shown for more effective seating of the valve diaphragm 40. The latter preferably comprises a rubber band extending continuously about the valve body.

Figure 3:
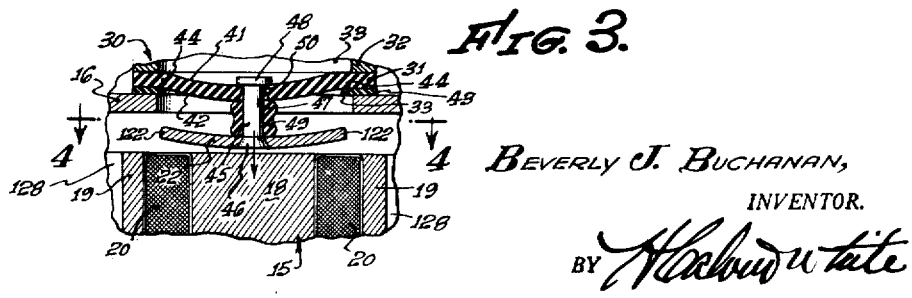
Fig. 3 is a view of a portion of Fig. 2 illustrating another position of the movable components.

The outer portion of the top surface 41 of the pump diaphragm 31 is compressed against a gasket 32, while the outer portion of the bottom surface 42 of the diaphragm seats against a resilient ring 43 interposed between the diaphragm and ring 16. Since the ring 43 preferably comprises an annular rubber body maintained in compression, it allows the overlapping portion of the diaphragm to deflect downward, as shown in Fig. 3, toward the displaced central portion of the diaphragm, when the latter is drawn toward the electromagnet. In this way, wear at point 44 of the diaphragm surface 42 is minimized, and somewhat increased diaphragm displacement is accommodated, both of which promote improved diaphragm pumping action.

Figure 4:
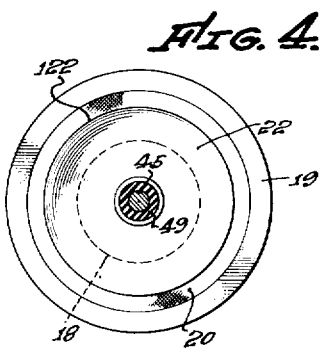
Fig. 4 is a view taken on line 4—4 of Fig. 3.

As shown in Figs. 2 through 4, circular armature 22 is carried by the diaphragm 31 by means of a central rod or pin 45 having a lower head 46 and extending upward through an opening 47 in the diaphragm toward the upper pin head 48 overlapping the opening and engaging the upper surface 41 of the diahpragm. Armature 22 is mounted on lower head 46 and held in spaced relation to the lower face 42 of the diaphragm by a rubber grommet 49 interposed therebetween, the grommet being in a compressed condition to prevent sideward movement of the pin and armature during pumping action.

The wall of the opening 47 in the diaphragm is closed toward the surface of pin 45 to engage its surface at 50 directly beneath and adjacent the pin head 48. All other portions of the wall 47 are spaced from the pin surface and are sloped or tapered downward and away from wall portion 50, so as to preclude rubbing engagement against the pin surface. While the annular wall portion 50 engages and centers the pin 45, the area of engagement is minimized, so as to minimize frictional rubbing between the pin surface and the diaphragm during reciprocation thereof. The effect of this construction is to promote the efficiency of pumping action by freeing the diaphragm from undesirably working against the pin during reciprocation. As a result, higher pumping pressures may be realized for the same power input to the diaphragm since frictional rubbing and undesirable working are eliminated.

Referring to the armature 22, it will be seen that the latter is protuberant toward the center pole 18 of the electromagnet to cause the center portion of the armature to project toward that pole beyond the spacial position of lateral portions 122 of the armature. The armature comprises a dished circular plate or disc shown to have its edge 122 spaced opposite the coil 20 between the center and annular side poles 18 and 19. The purpose of this armature construction is to prevent vibration of the edges of the armature against electromagnet, shuold axial misalignment of the armature with respect to center pole 18 occur. Since the disclosed arrangement requires that the side or edge of the armature be spaced further from the electromagnet than its center, it is desirable that such increased spacing not exceed the amount required to prevent vibration, so as not to cause such an increase in the air gap between the armature and electromagnet as would materially impair the efficiency of armature interaction with the electromagnet. Since the center of the armature disc may be moved closer to the electromagnet without causing vibration, more efficient electromagnetic coupling and reduced input power requirements are realized.

The present invention has particular utility when used to pump air or other gases, as for example in the aquarium aerator pump shown in the drawings. In such a pump it is important that the pumping unit run quietly and efficiently for long periods of time, and to meet these requirements, vibration of moving parts must be eliminated and frictional rubbing and wear of moving parts minimized. In the pump shown in the drawings, when the armature 22 is drawn toward the pole 18 of the electromagnet, the diaphragm 31 flexes toward the electromagnet and the wall of the opening 47 in the diaphragm moves further away from the surface of the pin 45. It is preferred to insert a lubricant such as graphite in the opening 47 to lubricate the engaged surfaces of the grommet and of the diaphragm during pumping action. The diaphragm and grommet preferably comprise synthetic rubber such as neoprene.

On movement of the armature toward the electromagnet, the resultant pressure reduction in the displacement chamber 33 deflects the bottom extent of the valve diaphragm 40 away from the undersurface of the valve block 36, to permit the flow of intake air from passage 37 and port 38 between the valve diaphragm and body across to port 39 from which the air enters chamber 33 through hole 52 in the diaphragm. Then upon upward pump displacement of the diaphragm 31, the air is discharged through port 39 and between the upper surface of the valve body and diaphragm 53 to hole 54 and thence to the outlet 35.

With the above improvements incorporated in an aquarium aerator pump of the type shown in the drawings, it has been possible to raise the average delivered pumping pressures from 2 p. s. i. to around 5 p. s. i. without materially increasing input power to the electromagnet, and without inducing vibration of the armature against the electromagnet. Prior to making these improvements, the same pump could not be made to deliver more than about 2 p. s. i. without accompanying vibration.

I claim:

1. An improved assembly for actuating a diaphragm pump of the reciprocating type, comprising an electromagnet having a pole and adapted to be connected to a source of alternating current, a flexible pumping diaphragm facing said electromagnet in spaced relation thereto, means mounting said diaphragm for movement toward and away from said pole along an axis therethrough, and a metallic armature carried by said diaphragm opposite said pole, said armature and pole forming therebetween a gap having increasing width transversely away from said axis having a protuberant surface extending toward said pole.

2. An improved assembly for actuating a diaphragm pump of the reciprocating type, comprising an electromagnet having a pole and adapted to be connected to a source of alternating current, a flexible pumping diaphragm facing said electromagnet in spaced relation thereto, means mounting said diaphragm for movement toward and away from said pole along an axis therethrough, and a metallic armature carried by said diaphragm opposite said pole, said armature having a convexly curved surface facing said pole and forming therebetween a gap having increasing width transversely away from said axis.

3. An improved assembly for actuating a diaphragm pump of the reciprocating type, comprising an E-section electromagnet having a center pole and adapted to be connected to a source of alternating current, a flexible pumping diaphragm facing said electromagnet in spaced relation thereto, means mounting said diaphragm for movement toward and away from said center pole along an axis therethrough, and a metallic armature carried by said diaphragm opposite said center pole, said armature and pole forming therebetween a gap having increasing width transversely away from said axis having a protuberant surface extending toward said pole.

4. An improved assembly for actuating a diaphragm pump of the reciprocating type, comprising an electromagnet having a pole and adapted to be connected to a source of alternating current, a flexible pumping diaphragm facing said pole and extending transversely in spaced relation thereto, means mounting said diaphragm for movement toward and away from said pole along an axis therethrough, and a transversely extending armature plate carried by said diaphragm opposite said pole, said plate and pole forming therebetween a gap having increasing width transversely away from said axis having opposite ends and a center portion extended toward said pole beyond a line through said ends.

5. An improved assembly for actuating a diaphragm pump of the reciprocating type, comprising an E-section electromagnet having center and opposite side poles and adapted to be connected to a source of alternating current, a flexible pumping diaphragm facing said center pole and extending transversely in spaced relation thereto, means mounting said diaphragm for movement toward and away from said center pole along an axis therethrough, and a transversely extending armature plate carried by said diaphragm opposite said center pole, said plate and pole forming therebetween a gap having increasing width transversely away from said axis having opposite ends extending respectively toward said opposite side poles and a center portion extended toward said center pole beyond a line through said opposite ends.

6. An improved pumping diaphragm assembly, comprising an elastomeric pumping diaphragm containing a central opening, means mounting the diaphragm for axial reciprocation, and a rod connected with the diaphragm for transmitting axial reciprocation thereto, said rod being received within said opening and centered therein by a portion of the diaphragm forming the opening, said portion having reduced axial thickness to reduce rubbing contact between the rod and diaphragm during said reciprocation.

7. The invention as defined in claim 6 comprising an axially tapered opening.

8. The invention as defined in claim 6 including an armature carried by the rod in spaced relation to the diaphragm, and a member held between and in engagement with the diaphragm and armature for axially centering the rod.

9. The invention as defined in claim 6 in which said rod extends through the diaphragm between opposite faces thereof.

10. The invention as defined in claim 9 in which said rod includes a head engaging the diaphragm.

11. The invention as defined in claim 6 including a lubricant confined in said opening.

12. The invention as defined in claim 8 in which said member comprises a rubber grommet overlapping said opening and confining a lubricant in said opening.

13. The invention as defined in claim 6 in which said mounting means comprises an elastomeric member engaging one face of the diaphragm near the edge thereof.

14. The invention as defined in claim 13 in which said member comprises an annular rubber ring.

References Cited in the file of this patent
UNITED STATES PATENTS

| | | |
|---|---|---|
| 2,253,206 | Farrow | Aug. 19, 1941 |
| 2,471,796 | Thiberg | May 31, 1949 |

FOREIGN PATENTS

| | | |
|---|---|---|
| 178,157 | Austria | Apr. 10, 1954 |

U. S. DEPARTMENT OF COMMERCE
PATENT OFFICE

CERTIFICATE OF CORRECTION

Patent No. 2,814,429     Beverly J. Buchanan     November 26, 1957

It is hereby certified that error appears in the printed specification of the above numbered patent requiring correction and that the said Letters Patent should read as corrected below.

Column 4, lines 33 and 34, claim 1, and lines 56 and 57, claim 3, strike out "having a protuberant surface extending toward said pole", each occurrence; lines 68, 69 and 70, claim 4, strike out "having opposite ends and a center portion extended toward said pole beyond a line through said ends"; column 5, lines 7, 8, 9 and 10, claim 5, strike out "having opposite ends extending respectively toward said opposite side poles and a center portion extended toward said center pole beyond a line through said opposite ends".

Signed and sealed this 24th day of June 1958.

(SEAL)
Attest:
KARL H. AXLINE
Attesting Officer

ROBERT C. WATSON
Commissioner of Patents